United States Patent [19]

Nagata et al.

[11] Patent Number: 4,920,699
[45] Date of Patent: May 1, 1990

[54] STRUCTURE OF A WEATHERSTRIP MEMBER FOR SEALING AN END OF A PANE OF WINDOW GLASS APPLICABLE TO A VEHICULAR DOOR

[75] Inventors: Nobuyoshi Nagata; Hideki Sugiyama; Kiyotaka Uemura; Mikio Takebayashi, all of Chiba, Japan

[73] Assignee: Kinugawa Rubber Industrial Co., Ltd., Chiba, Japan

[21] Appl. No.: 155,117

[22] Filed: Feb. 11, 1988

[30] Foreign Application Priority Data

Feb. 18, 1987 [JP] Japan ............................. 62-035162
Mar. 12, 1987 [JP] Japan ............................. 62-057848
Mar. 13, 1987 [JP] Japan ............................. 62-058478

[51] Int. Cl.$^5$ .............................................. E06B 7/22
[52] U.S. Cl. ........................................ 49/441; 49/489
[58] Field of Search ............... 49/374, 375, 440, 441, 49/489

[56] References Cited

U.S. PATENT DOCUMENTS

| | | | |
|---|---|---|---|
| 3,479,768 | 11/1969 | Smadja | 49/441 |
| 3,918,206 | 11/1975 | Dochnahl | 49/441 |
| 4,648,207 | 3/1987 | Shibasaki | 49/441 |
| 4,667,442 | 5/1987 | Hiramatsu et al. | 49/441 |
| 4,704,820 | 11/1987 | Kisanuki | 49/489 X |

FOREIGN PATENT DOCUMENTS

| | | |
|---|---|---|
| 7244284 | 11/1972 | Fed. Rep. of Germany . |
| 3239395 | 5/1983 | Fed. Rep. of Germany . |
| 3442840 | 6/1985 | Fed. Rep. of Germany . |
| 59-37373 | 10/1984 | Japan . |
| 60-11225 | 1/1985 | Japan . |

*Primary Examiner*—James R. Brittain
*Attorney, Agent, or Firm*—Foley & Lardner, Schwartz, Jeffery, Schwaab, Mack, Blumenthal & Evans

[57] ABSTRACT

An improved structure of a weatherstrip member for sealing an end of a pane of window glass applicable to a vehicular door is disclosed wherein a bleed rubber material mixed with a lublicant is used in a pair of seal lips extended from tips of the pair of side wall portions to reduce sliding resistance of the seal lips against side surfaces of the pane of window glass pane, a thicker bottom portion (rib) is provided on a part of the bottom of the weatherstrip member so that when the end of the pane of window glass is inserted in an internal space defined by the weatherstrip member with an offset toward the vehicular outside portion from a center line of a door sash, the thicker portion and a thinner part of the bottom portion of the weatherstrip member on which the top surface of the end of the pane of window glass is touched are contacted with the bottom portion of the door sash. In addition, one of the pair of seal lips extended from the tips of the side wall portions has a bending point deviated toward the vehicular inner side to make the lengthes of both seal lips equal to each other so that when the pane of window glass is inserted as described above and contacted with a portion of the weatherstrip member which is deviated in the vehicular outside direction, the face contact therebetween can be assured.

5 Claims, 1 Drawing Sheet

STRUCTURE OF A WEATHERSTRIP MEMBER FOR SEALING AN END OF A PANE OF WINDOW GLASS APPLICABLE TO A VEHICULAR DOOR

BACKGROUND OF THE INVENTION (1) Field of the invention

The present invention relates to an improved structure of a weatherstrip member for sealing an end portion of a pane of window glass applicable to a vehicular door, which assures a superior characteristic of sealing for the weatherstrip member against such a laterally slidable or longitudinally movable pane of the vehicular door window glass located on a corresponding sash portion of a vehicle body.

(2) Background of the Art

One of the conventional weatherstrip members described above will be described below.

It is noted that such weatherstrip members as described above are also referred hereinafter to as window glass run channels. Such glass run channels are attached to respective door window sashes formed on a vehicle body. Each glass run channel is made of integrally extruded rubber or synthetic resin such as polyvinyl chloride, both materials of which are integrally extruded. The glass run channel includes a bottom portion and a pair of side wall portions. These portions are integrally formed substantially in a letter U shape of cross section. In addition, both tips of the pair of side wall portions are formed with flexible seal lips slanted so as to face toward the bottom portion, respectively.

Furthermore, a surface of each seal lip slidably contacted with the corresponding end surface of the pane of the door window is treated with flocked fabrics in order to improve a water-proof characteristic and less noise propagation characteristic to the longitudinally movable pane of the door window glass and reduce a sliding resistance of the glass run channel against the pane of the door window glass when the pane of door window glass pane is moved so as to close the door.

However, since in the structure of the window glass run channel described above the flocked fabrics to treat the surface of each seal lip are processed after the extrusion of the window glass run channel is carried out, a man-hour (defined as a product of a number of persons and times required to complete a work) are additionally needed and manufacturing cost is accordingly increased.

It should be noted that although projections are formed on the surface of each seal lip along their elongated directions to simplify the structure of the window door glass run channel, such a kind of the structure is not necessarily sufficient to provide the water-proof characteristic and the high noise suppression characteristic and the structure provides the larger sliding resistance when the pane of window glass is moved longitudinally to engage the sash portion.

Next, a Japanese Utility Model Application First (unexamined) Publication Sho No. 60-11225 published on Jan. 25, 1985 exemplifies another but similar conventional structure of the window glass run channel.

In the above-identified Japanese Utility Model Application First Publication, one of the seal lips located at a vehicle outside portion needs to be relatively short and the other seal lip needs to be relatively long to provide the sealing on both sides of the tip of the pane of door window glass which is offset toward the vehicle outside portion from the center longitudinal line.

This is because as recent trends convexities and concavities of the whole surface of the vehicle body need to be reduced (so called, making the surface of the vehicle body flush) in order to improve an aero dynamic characteristic for the vehicle. In order to achieve such a flush surface of the vehicle body, the pane of window pane needs to be arranged so as to direct toward the outside of the vehicle body with respect to the sash portion of the vehicle body as outer as possible. Therefore, the end edge of the window door pane will be inserted in the sash portion at a position of the bottom of the sash portion offset from the center line thereof toward the outside portion.

However, in the conventional structure of the window glass run channel disclosed in the above-identified Japanese Utility Model Application First Publication, the longer one seal lip at the inner side of the vehicle body is deformed and bent from a connecting point, or base point, to the one of the side wall portion in the same way as the other seal lip at the outside portion of the vehicle body. Therefore, it becomes difficult to provide a sufficient sealing reaction force against the pane of window glass. In addition, only the tip portion of the one longer seal lip is contacted with the end edge of the pane of window glass under pressure in little face contact manner so that a failure in sealing thereat (leakage of water such as rain drops) will easily occur.

Furthermore, since the tip portion of the longer other seal lip is brought in contact with the bottom portion of the window glass run channel and then is unnaturally deformed, the failure in the sealing thereat will more easily occur during long use of such weatherstrip members.

Next, a Japanese Utility Model Application Second (Examined) Publication Sho No. 59-37373 published on Oct. 17, 1984 exemplifies still another but similar structure of the window glass run channel.

The window glass run channel disclosed in the above-identified second publication includes a main body retained in a retaining groove of the window sash portion substantially in a rectangular shape of cross section and two seal lips extended along the elongated direction of an upper surface of an upper wall of the main body. Two opposing concave grooves are formed on the main body which are engaged with respective inner end projected portions of inner and outer supporting pieces of the window sash portion. The inner and outer supporting pieces constitute the retaining groove. The pair of other seal lips are, furthermore, integrally extended from the concave grooves so as to slant upward to direct in the center position of the bottom portion, i.e., lower surface of the upper wall of the main body. The pair of the other seal lips are so structured that inner surfaces of the tips of the respective lips grasp and seal both side surfaces of an upper end portion of the pane of the window glass when the pane of window glass is moved in a space defined by the main body.

On the other hand, each seal lip on the upper wall of the main body is extended toward intermediate positions of the upper wall of the sash portion with respect to an extended line in line with a direction in which the window pane is inserted so as to form substantially in a letter Y shape of cross section on the sash portion. When the tip of the pane of window glass presses the lower surface of the upper wall of the main body, a tip portion of each seal lip placed on the upper surface of the upper wall depresses the corresponding bottom surface of the retaining groove so that it is deformed, thus a space defined by the upper surface of the main body and bottom surface of the window sash portion being sealed.

However, since in the above-described structure of the window glass run channel disclosed in the above-identified Japanese Utility Model Application Second Publication the tips of the seal lips formed on the center position of the upper surface of the upper wall of the main body are merely contacted with and stretched against the bottom surface of the retaining groove. Therefore, a sufficient sealing characteristic for the above-described space cannot be achieved and water or dust will leak and enter from the vehicle outside at the space. In addition, since the window glass is merely moved in the main body in the above-described direction, no contrivance is carried out to cope with the above-described flush surfacing of the vehicle body.

SUMMARY OF THE INVENTION

It is, therefore, an object of the present invention to provide an improved structure of a weatherstrip member for sealing a pane of window glass applicable to a vehicular door which has a superior sealing characteristic and noise propagation suppression characteristic both against an inner side of the vehicle with reduced manufacturing cost and sliding resistance between the weatherstrip member and pane of window glass and a flush surfacing of the vehicle body being achievable.

The above-described object can be achieved by providing a structure of a weatherstrip member for sealing an end of a pane of window glass for a vehicular door, comprising: (a) a weatherstrip member substantially in a letter U shape of cross section having a bottom portion and a pair of side wall portions, these portions defining an internal space for receiving the pane of window glass; (b) a door sash portion having a sash bottom portion and a pair of sash side wall portions for receiving the weatherstrip member; and (c) means provided on the weatherstrip member for providing a face contact of a portion of the weatherstrip member with at least one part of the end of the pane of window glass when the pane of window glass is moved to close the door.

The above-described object can be achieved by providing a structure of a weatherstrip member for sealing a portion of a plate-like member, comprising; (a) a first member defining a substantially letter U shape of cross section and having a bottom portion and substantially vertically extended opposing wall portions having mutually opposing convexities; and (b) an elastic member fitted in the first member with a clearance thereof against the bottom portion of the first member, a thicker portion being provided on a bottom portion so as to offset from a center vertical line of the first member in cross section and a thinner portion being provided thereon at a distance offset from the thicker portion so that when a tip surface of the plate-like member depresses the thinner portion of the elastic member, the thinner portion is contacted with the bottom portion of the first member and a surface of the thicker member is also contacted with the bottom portion of the first member.

The above-described object can be achieved by providing a structure of a weatherstrip member for sealing a portion of a plate-like member, comprising: (a) a first member having a bottom portion and substantially vertically extended wall portions having mutually opposing convexities; and (b) an elastic member fitted in the first member, a pair of wall portions thereof having a pair of seal lips extended from tips of the wall portions toward the inner sides so as to slidably contact with side portions of the plate-like member, one of the seal lips having a bend point located so that both seal lips are brought in face contact with the side portions of the plate-like member.

DETAILED DESCRIPTION OF THE PREFERRED EMBODIMENTS

Reference will be made to the drawings in order to facilitate understanding of the present invention.

Figure 1:
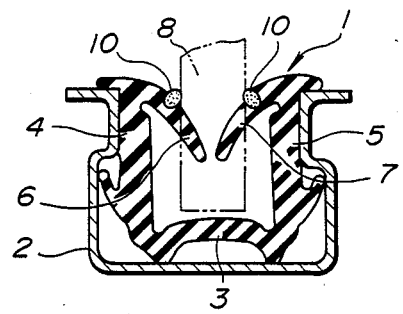
FIG. 1 is a cross sectional view of a first preferred embodiment of a structure of a weatherstrip member for sealing a pane of window door glass applicable to the vehicular door according to the present invention.

FIG. 1 shows a first preferred embodiment of a structure of a weatherstrip member for sealing a pane of window glass of a vehicular door according to the present invention.

In the first preferred embodiment of the weatherstrip member (window glass run channel) generally denoted by 1, corresponding parts of a pair of seal lips denoted by 6 and 7 are formed with bleeded rubber material mixed with a lubricant. These parts are slidably contacted with side surfaces of the pane of widow glass denoted by 8.

The glass run channel 1 is, e.g., made of a solid rubber and is formed with a bottom portion 3 and a pair of side wall portions 4, 5, these portions being substantially in a letter U shape of cross section. Seal lips 6 and 7 are formed which slant toward the bottom portion 3 on tip edges of the pair of side wall portions 4, 5. In addition, sponge portions 10 are installed made of bleeded rubber on parts at which the pair of seal lips 6,7 are slidably contacted with the pane of window glass 8. The bleed rubber is mixed with the lubricant. The sponge portions 10 are half buried into the seal lips 6, 7 made of the solid rubber and parts of them are projected from the surfaces of the seal lips 6, 7. It is noted that the sponge portions 10 are formed of the bleeded rubber which is formed by a double extrusion at the same time of the extrusion of the solid rubber part.

An example of the mixture of the above-described bleeded rubber is exemplified below.

| | |
|---|---|
| EPDM (Ethylene-propylene rubber) | 100 parts of weight |
| Zinc oxide | 5 parts of weight |
| Stearic acid | 1 part of weight |
| Processing acid | 2 parts of weight |
| Oxide calcium | 6 parts of weight |
| FEF carbon | 80 parts of weight |
| calcium carbonate | 40 parts of weight |
| Paraffic series oil | 40 parts of weight |
| DOP (Dioctyl phthalate) | 5 parts of weight |
| Accerelating agent | |
| CBS | 2.0 parts of weight |
| TMTD | 0.5 parts of weight |
| MBT | 1.0 parts of weight |

| | |
|---|---|
| -continued | |
| Sulfur | 1.5 parts of weight |

In the example of compound agent, the DOP (Dioctyl phthalate) is blended as the lubricant. However, DOA (Dioctyl azipate) or DOS (Dioctyl cebakate) may alternatively be used.

Since in the bleeded rubber having the above-described composition DOP blended as the lubricant is relatively poor in its soluidability as a rubber base material, it is progressively bleeded, i.e., bleeded out onto the surface. Therefore, the surfaces of the pair of seal lips 6,7 are always wet by means of the lubricant such as DOP. Consequently, a sliding resistance of the weatherstrip member against the pane of window glass during the upward and downward movements of the pane of window glass 8 is kept very small. Since the lubricant is always present between the surfaces of the pane of glass window 8 and seal lips 6,7, the water proof characteristic and noise propagation suppression characteristic become superior and wear resistance characteristic is also improved. Since the bleed of the lubricant is generated by a small quantity over a very long period of time, the effect thereof retains over the long period of time.

Since a part of the seal lips 6,7 may be processed by means of the double extrusion merely using the bleeded rubber as different from the treatment of the conventional flocked fabric, a special surface treatment process upon the extrusion of the window glass run channel 1 can be eliminated. Therefore, the man-hour and manufacturing cost can accordingly be reduced. It is noted that the sponge portion 10 made of the bleeded rubber is projected from the pair of seal lips 4,5. However, the whole surfaces of the pair of the seal lips 6, 7 may be formed with the bleeded rubber.

As described above, in the glass run channel 1 of the first preferred embodiment, at least one part of the pair of seal lips is formed with the bleeded rubber. Therefore, the water tight characteristic and noise propagation suppression characteristic between the pane of window glass and the pair of the seal lips can be enhanced and the reduction of the sliding resistance when the pane of window glass is moved upward and downward can be achieved. In addition, the surface treatment at the other step such as the production of floked fabric can be omitted. Thus it is advantageous in reducing the man-hour and manufacturing cost.

Figure 2:
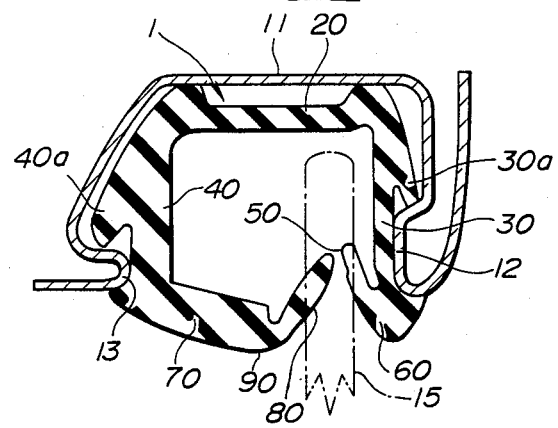
FIG. 2 is a cross sectional view of a second preferred embodiment of the structure of the above-described weatherstrip member.

FIG. 2 shows a second preferred embodiment of the structure of the weatherstrip member for sealing the pane of window glass of the vehicular door.

The glass run channel 1 is made of a rubber or a synthetic resin such as a vinyl chloride which is integrally extruded in the same way as in the first preferred embodiment. In the second preferred embodiment, engagement pieces 30a, 40a are formed on the side wall portions 30,40, respectively, so that the engagement pieces 30a, 40a are engaged on the inside portions of the engagement portions 12, 13 formed on both sides of the sash portion 11 of the vehicle body to hold the glass run channel 1 on the sash portion 11.

In addition, the vehicle outer seal lip 50 which slants toward the bottom portion 20 is extended from the tip end of the above-described vehicular outside side wall portion 30. The outer seal lip 50 is connected to the side wall portion 30 and the connected portion 60 is bendable as a bending point.

On the other hand, on the tip end portion of the inner side wall portion 40, a thick lip supporting portion 70 is formed which is projected toward the surface of the pane of window glass 15. The tip end of the lip supporting portion 70 is extended toward a position which is substantially symmetrical to the curved portion 60 of the vehicular outer seal lip 50 with the pane of window glass 15 as a center. The vehicular inner seal lip 80 which is relatively thin and slants toward the bottom portion 20.

In the structure of the second preferred embodiment, when end edges of the window glass pane 15 are inserted in the sash portion 11, the relatively thick lip supporting portion 70 is not bent toward or away from the side wall portion 40. Then, only the vehicular inner side seal lip 80 is bent from the connecting point to the lip supporting portion 70 as the bending point 90 so as to contact with the surface of the pane of window glass 15 under pressure In other words, since the vehicular inner side seal lip 80 itself which is bent and deformed is relatively short. Thus, the sealing reaction force can sufficiently be ensured. In addition, the vehicular seal lip 80 is assured to be in contact with a part of the side surface of the pane 15 which faces the inside of the vehicle. Therefore, no failure in the sealing will result. As the consequence of the shortened vehicular inside seal lip 80, no failure of the vehicular seal lip 80 in touch on the bottom portion 20 will result during the bending motion.

It is noted that in the second preferred embodiment the vehicular inner seal lip 80 is thinner than the lip supporting portion 70 and the position of the bending point 90 is placed at the appropriate position of the lip supporting portion 70.

It is possible to change material qualities of both vehicular seal lip 80 and lip supporting portion 70 to cause the vehicular inner side seal lip 80 to be bent toward the lip supporting portion 70.

As described above, since in a case where in the flush surface type window glass run channel the pane of window glass 15 is largely offset from the center position of the sash portion toward the outside portion 11 thereof, the length of the vehicular inner side seal lip which is bent and deformed can become relatively thinner. Hence, the reaction force of sealing can sufficiently be assured and the seal lip end portion can be contacted with the appropriate position of the pane of window glass 15. Consequently, the sealing property can be improved. In addition, with no contact of the tip of the vehicular inner side seal lip with the bottom portion of the glass run channel, the seal lip will not unnaturally be deformed.

Figure 3:
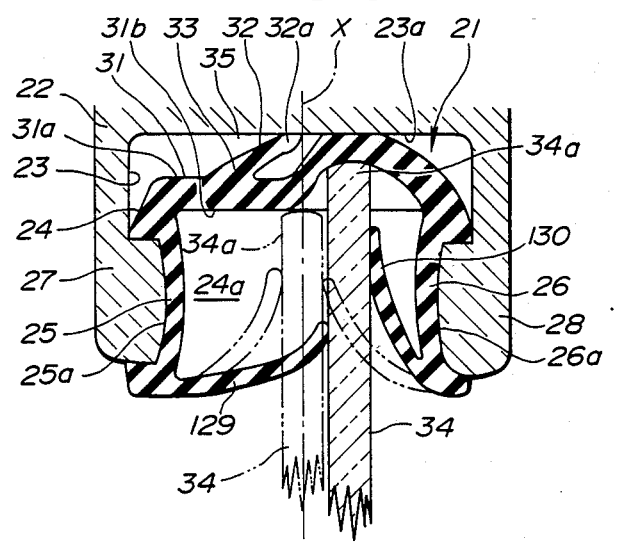
FIG. 3 is a cross sectional view of a third preferred embodiment of the structure of the above-described weatherstrip member.

FIG. 3 shows a third preferred embodiment of the structure of the weatherstrip member according to the present invention.

The weatherstrip 21 held in a retaining groove 23 of the window frame 22 in the third preferred embodiment has the construction closer to that disclosed in the Japanese Utility Model Second Publication Sho No. 59-37373. Recessed grooves 25a,26a are provided with which the respective supporting pieces 27, 28 are engaged on the respective outer surfaces of both side walls 25, 26 at the vehicle outside and inside portions of the main body 24 in the glass run channel 21. Upwardly extending grasping pieces 129, 130 are provided on the inner sides of the respective lower ends of both side walls 25, 26.

However, the large difference is that a single seal lip 32 is formed along the elongated direction of the main body 24 on the upper surface 31a of the upper wall 31 of the main body 24. The seal lip 32 is obliquely extended toward the outside portion of the main body 24 (right side as viewed from FIG. 3). A relatively thick base portion 33 is, in addition, arranged with a small offset toward the inner side (left side as viewed from FIG. 3) with respect to the extended line X along which the window glass pane 34 is moved from the downward direction. A tip portion 32a with which the bottom surface 23a of the retaining groove 23 is contacted is, furthermore, arranged in line with the extended line X.

Hence, in the third preferred embodiment, when the pane of window glass 34 is moved so as to close the door, a tip portion 34a of the window glass pane 34 which has been inserted in the inside portion 24a of the main body 24 is depressed on the lower surface 31b of the upper wall 31. At this time, the tip portion 34a is striken on the right side edge of the thick base portion 33 of the seal lip 32 so as to shift toward the vehicle outside due to the reaction force of the base portion 33 together with the upward movement thereof. Therefore, the tip portion 34a of the pane of window glass 34 approaches the outside surface of the vehicle outside supporting piece 28 of the window sash 22 so that a step difference between the pane of the window glass 34 and supporting piece 28 becomes small. At the same time, part of the upper wall 31 of the main body 24 is depressed upward upon the touch of the tip portion 34a. Therefore, part of the upper wall 31 is flexed and deformed upward to bring part of the upper wall 31 in close and face contact with the bottom surface 23a of the retaining groove 23. Since, at this time, a space 35 is sealed with the seal lip 32 and a part of the upper surface 31a of the upper wall 31 having a large contacting surface with which the seal lip 32 is contacted, the invasion of water into the vehicle inside portion can perfectly be interrupted even though water is invaded into the space 35 from the outside of the vehicle.

It is noted that the seal lip 32 may be formed in the opposite direction to that shown in FIG. 3.

Since, in the third preferred embodiment, the sealing action can be achieved with the seal lip and the upward surface of the main body having the large contacting surface area, the improvement of the sealing performance can be achieved. In addition, since the pane of window glass may be shifted toward the outside portion of the vehicle body when the pane of window glass is moved so as to close the door, the demand for making the surface of the vehicle body flush can be satisfied at the same time. Thus, the extreme practicability can be enriched.

Therefore, the superior sealing characteristic of the structure of the weatherstrip member for sealing the pane of the door window glass can be achieved. According to the present invention, the flush surface type glass run channel of the vehicular door described in the first, second, and third preferred embodiments can assure the reaction force of sealing when the pane of the window glass is moved so as to enter the sash portion in the outer direction of the vehicle body with respect to the center longitudinal line of the sash portion. It is noted that the concept of the first preferred embodiment can be applied to the second preferred embodiment and the third preferred embodiment and the concept of the second preferred embodiment can also be applied to the third preferred embodiment.

Furthermore, the window glass run channel according to the present invention has various advantages.

It will be appreciated by those skilled in the art that the foregoing description is made in terms of the preferred embodiments and various changes and modifications may be made without departing from the scope of the present invention which is to be defined by the appended claims.

What is claimed is:

1. A door construction, comprising;
    a door frame including a door sash portion having a sash bottom portion and opposing side portion;
    a pane of window glass for a vehicular door, said pane of window glass being movable between a closed position and an open position,;
    a weatherstrip member adapted to be received in said door sash portion, said weatherstrip member being substantially in a letter U shape of cross section having a bottom portion and a pair of said wall portions, these portions defining an internal space for receiving the pane of window glass;
    said weatherstrip member having a thickened support portion extending laterally and outwardly toward a second of said side wall portions from a first upper tip of said first side wall portion,
    means provided on the weatherstrip for providing a face contact with at least one part of the end of the pane of window glass when the pane of glass window is moved to said closed position, the means comprising first and second seal lips arranged to come into face contact with the side surfaces of the end of the pane of window glass when the pane of window glass is moved to said closed position; said first seal lip extending obliquely toward said bottom portion from a terminal portion of said thickened support; and said second seal lip extending obliquely toward said bottom portion from a second upper tip of said second wall portion; and
    means for pivoting said first and second seal lips about said terminal portion and second upper tip, respectively;
    said thickened support portion being of sufficient thickness to prevent bending thereof upon movement of said pane of window glass to said closed position;
    said thickened support portion being substantially thicker than said seal lips.

2. The structure of the weatherstrip member as set forth in claim 1, wherein the pane of window glass is inserted in the internal space of the weatherstrip member with a given offset toward an outer side of the vehicle from a center longitudinal line of the sash portion of its cross section.

3. The structure of the weatherstrip member as set forth in claim 1, wherein the means comprises a seal lip extended from the bottom portion of the weatherstrip member toward the bottom portion of the sash portion so that when a part of the bottom portion of the weatherstrip member comes in contact with a top surface of the pane of window glass said bottom portion comes into face contact with the bottom sash portion.

4. A door construction, comprising:
    a door frame including a door sash portion, said door said portion having a first member
    a substantially letter U shape cross section and having a bottom portion and substantially vertically extended opposing wall portions having mutually opposing convexities:

a pane of window glass disposed in said door frame, said pane of window glass being moveable between a closed position and an open position; and an elastic member disposed to receive said pane of window glass, said elastic member being fitted in the first member, said elastic member including means for urging said pane of window glass toward a first of said opposing wall portions, said means comprising:

(a) a thicker portion provided on a bottom portion of said elastic member, thereby to define a clearance between said thicker portion and said first member, and (b) a thinned portion provided at a distance offset from the thicker portion and spaced from said first member to form a clearance between said thinner portion and said first member so that when a tip surface of the pane of window glass depresses the thinner portion of the elastic member, the thinner portion of the elastic member is urged toward and contacts the bottom portion of the first member and a step is created between the thicker portion and the thinner portion to urge the pane of window glass away from said thicker portion and toward said first of said opposing wall portions, wherein said thicken portion extends from said step substantially to a second of said opposing wall portions.

5. The structure of the weatherstrip member as set forth in claim 4, wherein the elastic member has a pair of seam lips extended from corresponding aide wall portions, one of the pair of seal lips having a bending point at which the seal lip is bent and which is located at a distance from a tip of the corresponding side wall portion so as to become equal in length to the other seal lip when the pane of window glass is inserted in the first member with the center line of said pane of window glass being deviated from a center line of the first member.

* * * * *